United States Patent
Llorente González et al.

(10) Patent No.: US 7,791,223 B2
(45) Date of Patent: Sep. 7, 2010

(54) METHOD AND DEVICE FOR PREVENTING THE DISCONNECTION OF AN ELECTRIC POWER GENERATING PLANT FROM THE ELECTRICAL GRID

(75) Inventors: José Igna'cio Llorente González, Pamplona (ES); Manuel Visiers Guixot, Pamplona (ES)

(73) Assignee: Gamesa Innovation & Technology, S.L., Pamplona (ES)

( * ) Notice: Subject to any disclaimer, the term of this patent is extended or adjusted under 35 U.S.C. 154(b) by 792 days.

(21) Appl. No.: 11/630,937

(22) PCT Filed: Jun. 28, 2005

(86) PCT No.: PCT/ES2005/000367

§ 371 (c)(1),
(2), (4) Date: Dec. 27, 2006

(87) PCT Pub. No.: WO2006/003224

PCT Pub. Date: Jan. 12, 2006

(65) Prior Publication Data

US 2009/0167088 A1    Jul. 2, 2009

(30) Foreign Application Priority Data

Jun. 30, 2004    (ES)    ................. 200401584

(51) Int. Cl.
*H02J 3/28*    (2006.01)
(52) U.S. Cl. ..................................... 307/103
(58) Field of Classification Search ............. 307/64–66, 307/103; 290/55, 44; 700/286
See application file for complete search history.

(56) References Cited

U.S. PATENT DOCUMENTS

| 5,127,085 | A |   | 6/1992  | Becker et al. |
|-----------|---|---|---------|---------------|
| 5,901,057 | A | * | 5/1999  | Brand et al. ................. 363/144 |
| 6,005,759 | A | * | 12/1999 | Hart et al. ...................... 361/66 |
| 6,137,191 | A | * | 10/2000 | O'Leary et al. ............. 307/125 |
| 6,215,202 | B1 | * | 4/2001 | Luongo et al. ................ 307/64 |
| 6,392,856 | B1 | * | 5/2002 | Kehrli et al. ................... 361/64 |

FOREIGN PATENT DOCUMENTS

| DE | 196 24 809 | 1/1998 |
| DE | 101 05 892 | 9/2002 |
| DE | 101 19 624 | 11/2002 |
| DE | 102 06 828 | 8/2003 |
| EP | 0 877 475  | 11/1998 |

* cited by examiner

*Primary Examiner*—Albert W Paladini
(74) *Attorney, Agent, or Firm*—Ladas and Parry LLP

(57) ABSTRACT

Procedures to prevent the disconnection of a park of electricity generators from a network in the event of a voltage sag, through which, upon detection of the sag, the voltage travelling to the network is controlled in proportion to the magnitude of the sag; the active power produced by the park, rather than sent to the network, is thus diverted into to storage and/or energy dissipation equipment, keeping the park voltage at a nominal level.

The invention also includes a device for carrying out procedures integrating a bypass, transformer, static inverter, static converter, capacitance and dissipation resistance unit, voltage sag detection circuit and control circuit.

7 Claims, 1 Drawing Sheet

METHOD AND DEVICE FOR PREVENTING THE DISCONNECTION OF AN ELECTRIC POWER GENERATING PLANT FROM THE ELECTRICAL GRID

FIELD OF THE INVENTION

The present invention concerns a procedure and device for preventing the disconnection of a park of electricity generators from the network in the event of a voltage sag, applicable especially to wind turbine parks.

BACKGROUND OF THE INVENTION

The connection of wind turbines to electricity distribution networks, as well as the use of such turbines as a means of supply for electrical machinery, creates specific problems in comparison to other sources of energy. Different solutions have been proposed for these problems.

One of such problems is the production of a short circuit in the network, causing the connection of the wind farm to change. To this respect, patent DE 10206828 proposes a control system to detect this short circuit, disconnecting the network from the wind turbine park which, without ceasing operation, has the means to dissipate and accumulate the energy produced until it can be reconnected to the network once the short circuit has been repaired.

Another problem is that of an over-voltage in the network, potentially affecting the wind turbine park. Patent DE 10105892 proposes a system to detect this problem and to create a solution, dissipating the excess energy produced in the form of heat.

Patent DE 19624809 proposes a filtration system in the alternative network itself to obtain a specific wave signal through the variation in rotor turning speed of an electric generator.

Finally, patent U.S. Pat. No. 5,127,085 limits or eliminates damaged currents in the alternative network which could cause a voltage surge in internal alternator components.

This last technique, however, does not address the problem caused by "voltage sags".

Sudden voltage steps can be caused in the connection to the electrical output network of a park of electric generators such as wind turbines, as a result of network defects. In such cases, implementing the proper protection disconnects the defective part of the network, producing a new voltage step in the opposite direction and restoring the voltage to the regular level, prior the defect. The combination of both steps is known as a "voltage sag" which can be defined by two parameters: both the magnitude and the duration of the voltage step.

A "voltage sag" can cause a wind turbine park to disconnect from a network, consequentially having damaging effects on the management of the network itself. Voltage steps also damage wind turbine operation as they cause a sudden change in voltage torque, affecting multiplier life. It is thus desirable to have the procedures and devices that can prevent these effects. The present invention offers a solution to that demand.

SUMMARY OF THE INVENTION

Firstly, the present invention causes an intervention to prevent the disconnection of a park of electricity generators, such as wind turbines, from a network in the event of a voltage sag, which comprises the following steps:

Permanent monitoring of the network voltage;

Upon detection of a voltage sag in the network, diversion of part of the active power produced by the park to a capacitance and dissipation resistance unit, maintaining the voltage of the park at a nominal level and controlling the voltage carried to the network in proportion to the voltage sag magnitude.

Secondly, this invention proposes a device for carrying out the aforementioned procedure which integrates, as principal components, the following:

a) A medium voltage bypass device;
b) A low voltage bypass device;
c) An integrated unit comprising a dc/dc static converter+ dc/ac inverter and a low voltage/medium voltage (LV/MV) series transformer.
d) A capacitance and dissipation resistance unit for absorbing the active power not carried to the network;
e) A circuit for detecting voltage sags in the MV network;
f) A control circuit for the conjunction of the aforementioned components. This allows the combined static converter and transformer to generate the voltage necessary to maintain the park voltage at a nominal level, it automatically controls the voltage carried to the network by the device according to the voltage sag magnitude and it enables the capacitance and dissipation resistance unit to store and dissipate the flow of active power generated by the park and not carried to the network. This device control circuit is connected to the control circuits for the aforementioned components, as well as to sensors which can detect the relevant parameters instantly.

Other characteristics and advantages of this invention can be found in the following detailed description, explaining its purpose, in relation to the attached diagram.

DETAILED DESCRIPTION OF THE INVENTION

Figure 1:
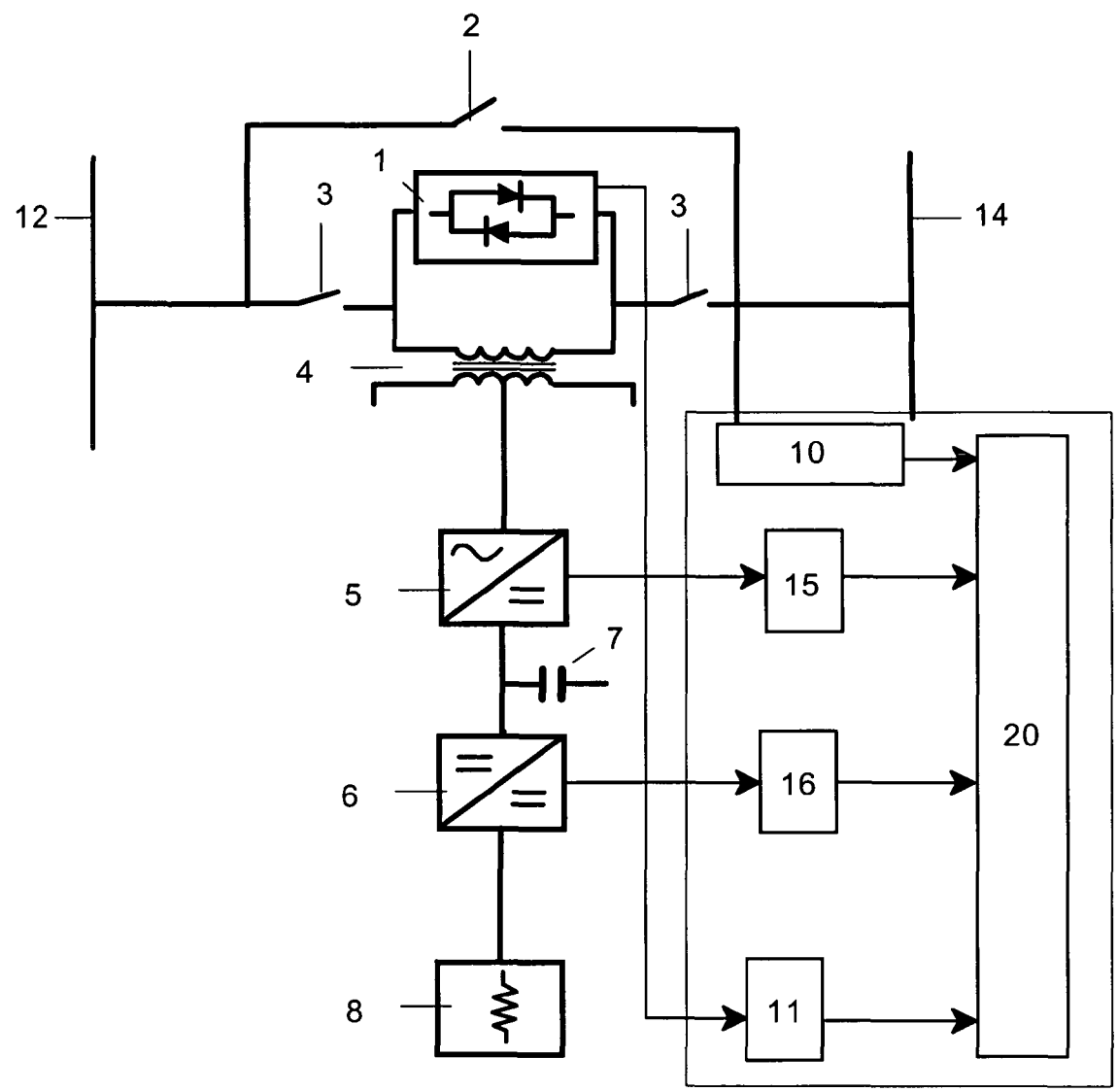
FIG. 1 shows a block diagram with the components that make up a device based on the present invention.

Implementation of the invention procedure comprises the following steps:

a) Permanent monitoring of the network voltage;
b) Generation, upon detection of a voltage sag, of an alternate voltage of suitable size and phase which, when added to that of the network, maintains the park voltage in each of the three phases;
c) Absorption of part of the active power generated by the park, diverting it to an electricity dissipation resistance unit, regulating the energy to be dissipated in a controlled manner;
d) Adjusting the level of voltage carried to the network in proportion to that of the voltage sag, restoring the correct network voltage level.

To this extent and in relation to FIG. 1, we will describe as follows the proper implementation of a device following the invention.

The device consists of the following components:

a) A medium voltage, three-phase static bypass device (1) with a control circuit (11) that carries out the tasks of start-up and stop, bypass control, post-alarm activity, external communication via RS-232, alarm display, etc. The device should preferably be able to activate in a time less than 150 microseconds and deactivate within 1 millisecond;
b) An automatic switch (2), functionally related to the aforementioned bypass device;

c) A low voltage protection device, with the relative circuits;
d) Isolators (3) for maintenance operations;
e) A LV/MV transformer (4), with its primary connected in series to the LV circuit;
f) A DC/AC static converter with a circuit (15) allowing control with DSP, which regulates voltage generation controlling both size and duration, to recover from the voltage sag and to control the input of active and reactive powers from both signs;
g) A DC/DC static converter (6) with a circuit (16) to allow control with DSP, which regulates continuous bus voltage through modifying the voltage bands that allow the drainage of continuous current into the dissipation resistance;
h) A unit formed by an energy storage capacity (7) and various dissipation resistances (8);
i) A DSP-controlled circuit (10) that instantly calculates the network voltage level, detects voltage sags and the frequency and angle of the network to detect voltage sags in the MV network (14) and which, moreover, is capable of detecting voltage sag magnitude and phase in less than 0.5 milliseconds using calculation algorithms implemented in the circuit microprocessor;
j) A control circuit (20) for the conjunction of the above-mentioned units, connected to the electronic controls (10, 11, 15, 16) corresponding to each of these units and which includes the following components:

Time-lag voltage sensors, for measuring the network voltage at the output of the device;
Time-lag voltage sensors, for measuring the network voltage of the park (12);
Time-lag intensity sensors for measuring the current sent to the network by the park;
Circuit for the adjustment and filtration of alternating voltage and current measures;
Continuous voltage sensors and relative adjustment circuit;
Electronic protection control systems which, in case of damage, ensure the continuous operation of the park.

The operation of the aforementioned system is described below.

In permanent network voltage mode:
The switch (2) is open.
The isolators (3) are closed.
The static bypass (1) is closed.
The protection device is open.
The combined DC/DC converter (6)+DC/AC inverter (5) unit is in "hot standby".
The capacitance (7) is charged to nominal voltage.
The resistances (8) are not dissipating energy.

When the network voltage sag detector circuit (10) detects a voltage sag, distinguished by an immediate high voltage level increase, of adjustable magnitude and duration and which is determined within 0.5 milliseconds, it activates the device from the present invention, producing the following events:

In temporary "voltage sag" mode:
Static bypass (1) is opened.
The DC/AC inverter (5) is activated and generates a voltage whose immediate level is given as:

$$\vec{Vi} = (\vec{V}parki - \vec{V}networki) = N$$

where:
V parki=immediate nominal park voltage level.
Vnetworki=level instantly measured by the medium voltage network voltage sensor.
N=record of transformation.

The LV/MV transformer (4) generates the necessary voltage to maintain the park voltage at its nominal level.
The combined DC/AC inverter (5) and transformer (4) unit allows the active power supplied by the wind turbine park to be absorbed.
The active power produces a DC intensity on the DC side of the DC/AC inverter (5) input, which charges the capacity (7).
The DC/DC converter (6), through the DC intensity sensor, detects this intensity and activates the converter control, which sends the active power to the dissipation resistances (8).

This temporary process continues during the "voltage sag" in the following manner:
The DC/AC inverter (5) automatically regulates the voltage sent to the network by the transformer (4) in each of the three phases, reducing the voltage input and thus allowing the correct network voltage to be restored, approaching the nominal level.
The active power absorbed is automatically reduced in the same way.
The DC/AC inverter (5) can also force reactive power into the network through the voltage input vector control, which is regulated in modules and phases.
The DC/DC converter (8) forces the necessary active power into the dissipation resistors, at a decreasing level until the correct network voltage has been fully restored.
The DC/DC converter (6) controls the instant intensity that circulates towards the resistors.
The DC/DC converter (6) controls the sharp intensity circulating around the capacitance and reduces it, diverting alternate intensity components to the resistors.

When the network (14) is restored, this is detected by the voltage sag detector circuit therein and the combined units switch to a stable condition.

The low voltage protection device ensures that, in case of poor functioning or damage to the inverter, there is no overvoltage produced in the low side of the transformer.

In the implementations we have just described, modifications can be made within the range of the following claims:

The invention claimed is:
1. Procedure to prevent the disconnection of a park of electric generators (12) from a network (14) in the event of a voltage sag including the steps of permanent monitoring of the network (14) voltage and, in the event of a voltage sag, regulating the voltage supplied to the network (14) in proportion to the magnitude of the sag, wherein said voltage regulation is carried out at a park level comprising steps of adjusting the voltage provided by the park (12) to the network (14), dissipating and/or storing the part of the active power generated by the whole park (12) which is not provided to the network (14), and maintaining the voltage in the park (12) at a nominal level.

2. Procedure to prevent the disconnection of a park of electric generators from a network in the event of a voltage sag according to claim 1, wherein said voltage regulation includes the following steps:
   i. generating, upon detection of a voltage sag, alternate voltage with appropriate size and duration which, added to that of the network, maintains a constant park voltage over all 3 phase;
   ii regulating the reactive power sent to the network during the voltage sag.

3. Procedure to prevent the disconnection of a park of electric generators from a network in the event of a voltage sag according to claim 1, wherein said electric generators are wind turbines.

4. A device to prevent the disconnection of a park of electric generators from a MV (14) network in the event of a voltage sag, comprising:
   a) a MV, three-phase, static bypass (1) device and an automatic switch (2) and two isolators (3) corresponding thereto;
   b) a low voltage protection device;
   c) a LV/MV series transformer (4);
   d) a DC/AC static inverter (5);
   e) a DC/DC static converter (6);
   f) a capacitance (7) and dissipation resistance (8) unit;
   g) a MV network voltage sag detection circuit (10);
   h) a control circuit (20) connected to electronic controls (11, 15, 16) of components a) d), e) and to said detection circuit (10); wherein said components are arranged so that in the event of a voltage sag in the MV (14) network detected by the detection circuit (10), the inverter (5) regulates the voltage sent to the MV network (14) by the transformer (4) in proportion to the magnitude of the voltage sag and the voltage sent to the MV internal network (12) for maintaining the park voltage at a nominal level, the active power generated by the park which is not directed to the MV network (14) is diverted to the capacitance (7) and resistance (8) unit, and the reactive power sent to the MV network (14) is controlled.

5. A device to prevent the disconnection of a park of electric generators from a MV (14) network in the event of a voltage sag according to claim 4, wherein the detection circuit (10) is capable of determining the size and duration of the voltage sag in a time no greater than 0.5 milliseconds using calculation algorithms implemented into the control circuit microprocessor.

6. A device to prevent the disconnection of a park of electric generators from a MV (14) network in the event of a voltage sag according to claim 4, wherein the bypass device (1) can be activated in a time less than 150 microseconds and can be deactivated in a time less than 1 millisecond.

7. A device to prevent the disconnection of a park of electric generators from a MV (14) network in the event of a voltage sag according to claim 4, wherein said electric generators are wind turbines.

* * * * *

UNITED STATES PATENT AND TRADEMARK OFFICE
CERTIFICATE OF CORRECTION

| | | |
|---|---|---|
| PATENT NO. | : 7,791,223 B2 | Page 1 of 1 |
| APPLICATION NO. | : 11/630937 | |
| DATED | : September 7, 2010 | |
| INVENTOR(S) | : Jose Ignacio Llorente Gonzalez et al. | |

It is certified that error appears in the above-identified patent and that said Letters Patent is hereby corrected as shown below:

Title page, item (75), Inventors: "Igna'cio" should read --Ignacio--.

Signed and Sealed this
First Day of February, 2011

David J. Kappos
*Director of the United States Patent and Trademark Office*